United States Patent [19]

Takeo et al.

[11] Patent Number: 4,951,201

[45] Date of Patent: Aug. 21, 1990

[54] METHOD OF AUTOMATICALLY DETERMINING IMAGED BODY POSTURE IN MEDICAL IMAGE DISPLAY

[75] Inventors: Hideya Takeo; Nobuyuki Tanaka; Nobuyoshi Nakajima, all of Kanagawa, Japan

[73] Assignee: Fuji Photo Film Co., Ltd., Kanagawa, Japan

[21] Appl. No.: 183,809

[22] Filed: Apr. 20, 1988

[30] Foreign Application Priority Data

| Apr. 20, 1987 | [JP] | Japan | 62-96709 |
| Apr. 20, 1987 | [JP] | Japan | 62-96710 |
| Apr. 20, 1987 | [JP] | Japan | 62-96711 |
| Apr. 20, 1987 | [JP] | Japan | 62-96712 |
| Apr. 20, 1987 | [JP] | Japan | 62-96713 |
| Apr. 20, 1987 | [JP] | Japan | 62-96714 |

[51] Int. Cl.$^5$ .......................................... G06F 15/42
[52] U.S. Cl. ............................ 364/413.13; 364/559; 382/6; 378/165; 250/484.1
[58] Field of Search ............... 382/6, 18, 19, 29, 30; 364/413.26, 559, 565, 413.22, 413.13; 378/20, 50, 165, 162; 250/484.1

[56] References Cited

U.S. PATENT DOCUMENTS

| 4,466,122 | 8/1984 | Auerbach | 382/17 |
| 4,504,972 | 3/1985 | Scherl et al. | 382/51 |
| 4,688,088 | 8/1987 | Hamazaki et al. | 382/18 |
| 4,870,694 | 3/1988 | Takeo | 382/18 |

FOREIGN PATENT DOCUMENTS

| 200379 | 11/1984 | Japan . |
| 134886 | 6/1986 | Japan . |
| 193004 | 8/1986 | Japan . |
| 080699 | 10/1986 | Japan . |

Primary Examiner—Jerry Smith
Assistant Examiner—Steven G. Kibby
Attorney, Agent, or Firm—Sughrue, Mion, Zinn, Macpeak & Seas

[57] ABSTRACT

A distribution of an image signal read from a stimulable phosphor sheet and bearing a transmitted radiation image of a human body is determined along a horizontal direction across the image. Signal values of the distribution along the direction are accumulated, and the rate of change of the accumulated values is determined to find the imaged posture of the image. Alternatively, the separation or the average value of the distribution is determined, or the pattern of the distribution is compared with a plurality of reference signal distribution patterns. The derivative of second order of a function approximated by the distribution pattern may be checked for its sign, or the distribution pattern may be checked to determine whether it is of a one-valley form or a two-valley form.

18 Claims, 9 Drawing Sheets

F I G. 4A
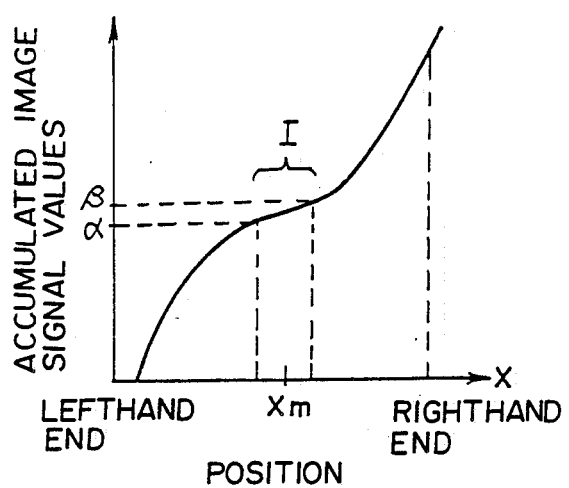
F I G. 4B
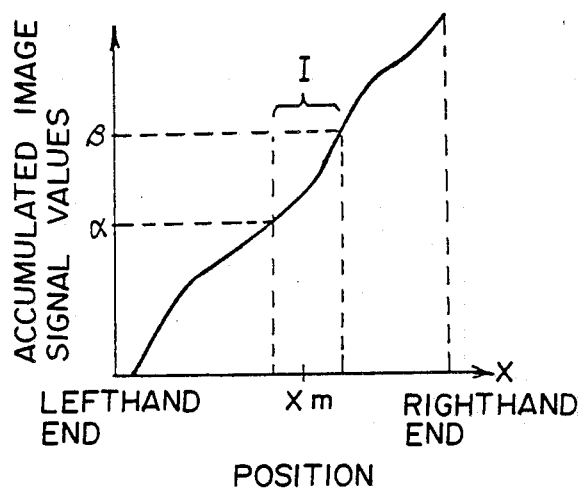

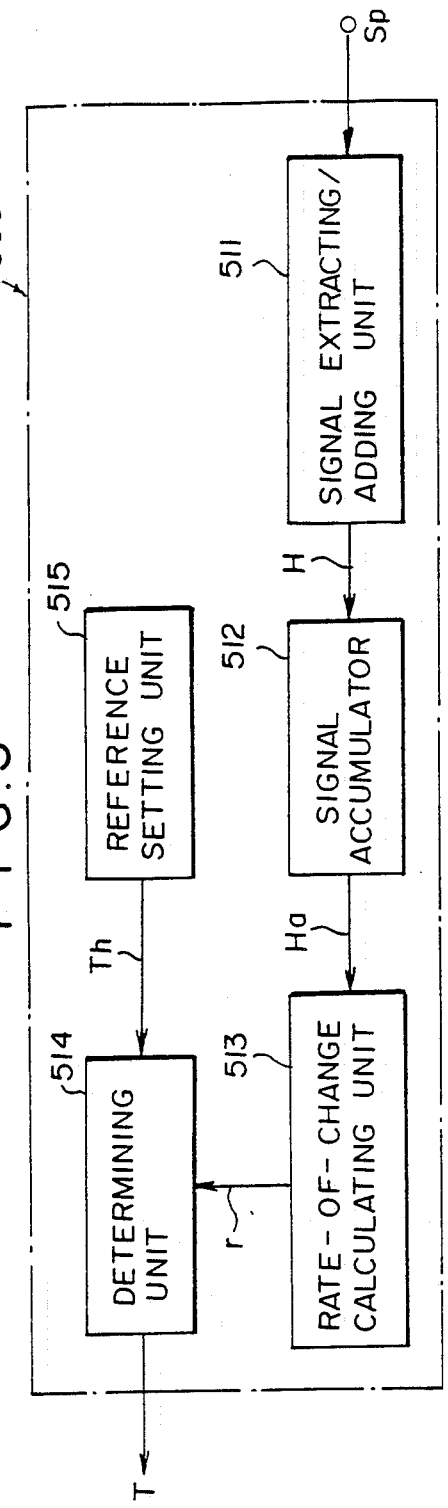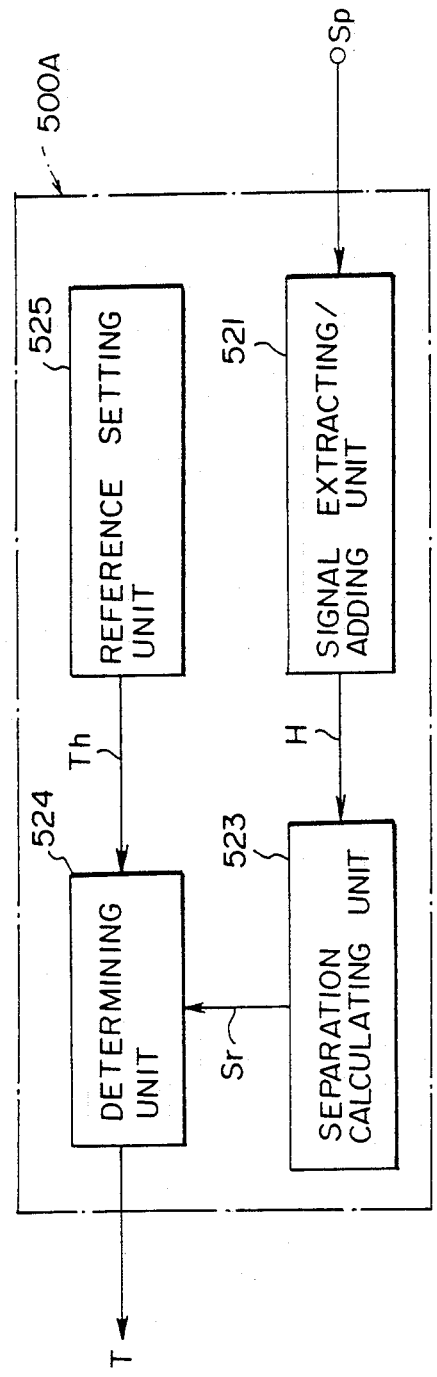

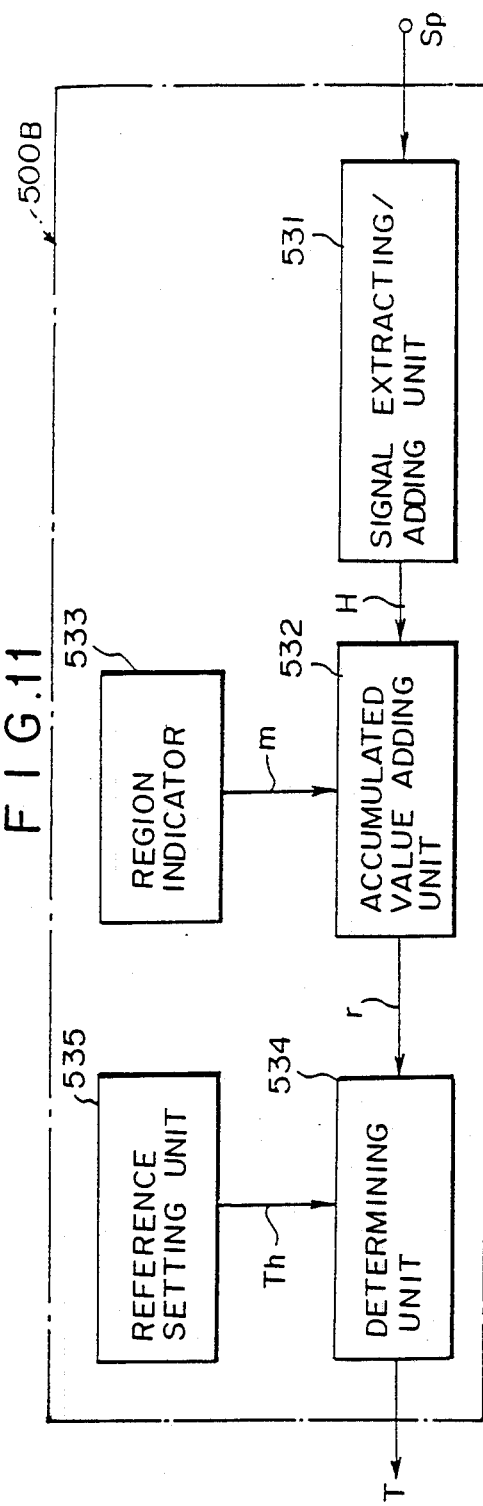

F I G. 12C
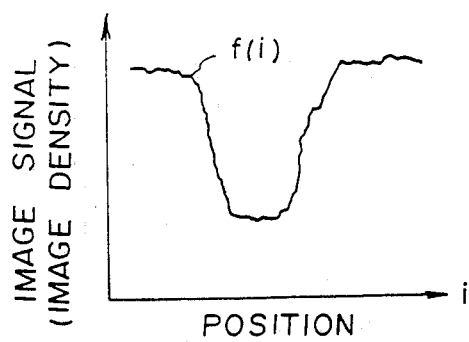
F I G. 14A
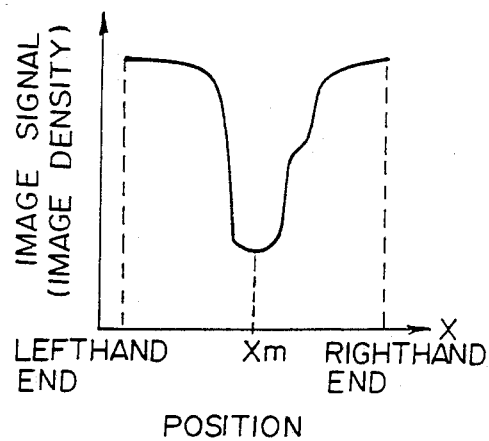
F I G. 14B
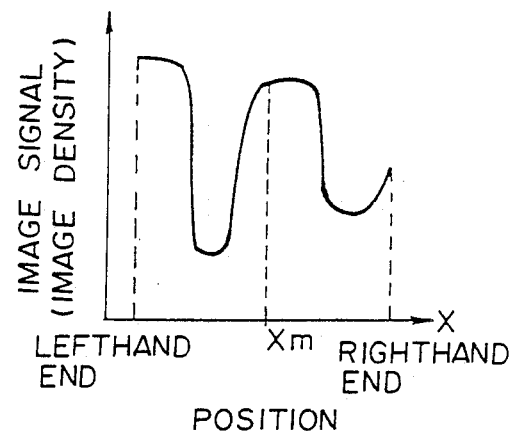

METHOD OF AUTOMATICALLY DETERMINING IMAGED BODY POSTURE IN MEDICAL IMAGE DISPLAY

BACKGROUND OF THE INVENTION

1. Field of the Invention

The present invention relates to a method of automatically determining the posture of an imaged human body in a medical imaging system such as a radiation imaging system.

2. Description of the Prior Art

A certain phosphor, when exposed to a radiation such as X-rays, $\alpha$-rays, $\beta$-rays, $\gamma$-rays, cathode rays, or ultraviolet rays, stores a part of the energy of the radiation. When the phosphor exposed to the radiation is exposed to stimulating rays such as visible light, the phosphor emits light (stimulated emission) in proportion to the stored energy of the radiation. Such a phosphor is called a stimulable phosphor.

There has been proposed a radiation image recording and reproducing system employing such a stimulable phosphor. In the proposed radiation image recording and reproducing system, the radiation image information of an object such as a human body is recorded on a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image signal that will be recorded as a visible image of the object on a recording medium such as a photographic material or displayed as a visible image on a CRT or the like (see Japanese Laid-Open Patent Publications Nos. 55-12429 and 56-11395, for example).

The radiation image recording and reproducing system is highly advantageous over conventional radiographic systems employing silver-salt photographs in that images can be recorded in a very wide range of radiation exposure. More specifically, it is known that the amount of light emitted from stimulable phosphor upon exposure to stimulating rays is proportional to the amount of radiation to which the stimulable phosphor has been exposed, in a highly wide range. Even if the amount of radiation exposure varies greatly under various imaging conditions, a read-out gain is set to a suitable level, and the amount of light emitted from a stimulable phosphor sheet is read and coverted into an electric signal by a photoelectric transducer. The electric signal is processed to produce a visible radiation image which is recorded on a recording medium such as photographic material or displayed as a visible image on a CRT or the like. By selecting a suitable read-out gain setting, the radiation image can be obtained which is not affected by variations in the amount of radiation exposure.

In the radiation image recording and reproducing system, in order to eliminate influences due to varying imaging conditions or obtain a radiation image which can well be observed, "recording information" indicating either a recording condition in which the radiation image information is recorded on a stimulable phosphor sheet or a recording pattern determined by the area of an object to be imaged such as a chest or a stomach, and an imaging process such as a simple imaging process or a contrast radiographic process, is reviewed prior to the output of a visible image to be observed. Then, the read-out gain is adjusted to a suitable level based on the recording information, and a recording scale factor is determined in order to optimize the resolution according to the contrast of the recording pattern. Where the image signal which is read out is processed such as for gradation processing, image processing conditions should be optimized.

One known process of reviewing recording information of a radiation image prior to the output of a visible image is disclosed in Japanese Laid-Open Patent Publication No. 58-67240. According to this known process, stimulating light having a level lower than the level of stimulating light to be applied in a "main reading mode" for obtaining a visible image to be observed is used to read, in a "preliminary reading mode", the recording information of a radiation image stored on a stimulable phosphor sheet prior to the main reading mode. In the preliminary reading mode, the condition in which the radiation image is recorded can roughly be understood. For effecting the main reading mode, the read-out gain is suitably adjusted, and the recording scale factor is determined, or image processing conditions are selected, on the basis of the information obtained in the preliminary reading mode.

According to the above conventional method, the recording condition and recording pattern of the radiation image information recorded on the stimulable phosphor sheet can be known prior to the main reading mode. Therefore, even if a reading system having a very wide dynamic range is not relied upon, a radiation image that can well be observed can be produced by adjusting the read-out gain to a suitable level and determining the recording scale factor based on the recording information, and processing an electric signal generated in the main reading mode according to the recording pattern.

Once the reading conditions and/or the image processing conditions of the radiation image information are thus determined, the densities of areas of interest in reproduced images of an object may vary from each other when the object is imaged at different postures. More specifically, in order to diagnose the thoracic vertebra of a patient, the chest is imaged from its front side as shown in FIG. 2A of the accompanying drawings and from a lateral side thereof as shown in FIG. 2B. When the chest is imaged from its front side as shown in FIG. 2A, the area of interest or the thoracic vertebra K overlaps the mediastinum which is less permeable to radiation. Therefore, the amount of radiation stored in the area of the stimulable phosphor sheet corresponding to the thoracic vertebra is low, and the amount of light which will later be emitted from this area is also low. When the chest is laterally imaged as shown in FIG. 2B, the thoracic vertebra K lies over the lung P which is more permeable to radiation. Consequently, the amount of radiation stored in the area of the stimulable phosphor sheet corresponding to the thoracic vertebra is high, and the amount of light which will later be emitted from this area is also high. Since the maximum value Smax and the minimum value Xmin of an image signal read from the stimulable phosphor sheet remain substantially unchanged regardless of whether the chest is imaged from its front side or lateral side, the reading conditions and/or the image processing conditions which are determined on the maximum value Smax and the minimum value Xmin are substantially the same when the chest is imaged from its front side and lateral side. When a radiation image is reconstructed in the main reading mode under these reading and/or image processing conditions, therefore, the imaged thoracic vertebra is of a relatively low density when it is imaged from its front side, and of a relatively high density when it is imaged from its lateral side.

It may be possible to dispense with the preliminary reading mode, and establish image processing conditions appropriately based on an image signal read in the main reading mode. However, the above drawbacks are also experienced with such an alternative.

To solve the aforesaid problems, it has been customary to enter information indicating what posture the object is taking while it is being imaged, into an image reading device or an image processing device, when radiation image information is read from a stimulable phosphor sheet, and to establish reading conditions and/or image processing conditions based on the entered posture information.

However, it has been highly tedious and time-consuming to enter posture information each time radiation image information is to be read from a stimulable phosphor sheet. In addition, the operator may enter wrong posture information in error.

SUMMARY OF THE INVENTION

It is an object of the present invention to provide a method of automatically determining the imaged posture of an object image which is recorded on a stimulable phosphor sheet, for example, for medical purpose.

According to the present invention, there is provided a first method of determining the imaged posture of a medical image, comprising the steps of determining a distribution of an image signal read from a stimulable phosphor sheet, i.e., an image signal bearing a transmitted image of a human body, along a prescribed direction across the image, accumulating signal values of the distribution along the direction to find accumulated values at points along the direction, determining a rate of change of the accumulated values in a region along said direction, and determining the imaged posture of the image based on the rate of change.

According to the present invention, there is provided a second method of determining the imaged posture of a medical image, comprising the steps of determining a distribution of an image signal read from a stimulable phosphor sheet, i.e., an image signal bearing a transmitted image of a human body, along a prescribed direction across the image, determining the separation of the distribution, and determining the imaged posture of the image based on the separation.

According to the present invention, a third method of determining the imaged posture of a medical image comprises the steps of determining a distribution of an image signal read from a stimulable phosphor sheet, i.e., an image signal bearing a transmitted image of a human body, along a prescribed direction across the image, determining an average value of the distribution near a central region of the image in the direction, and determining the imaged posture of the image based on the magnitude of the average value.

According to the present invention, a fourth method of determining the imaged posture of a medical image comprises the steps of determining a distribution of an image signal read from a stimulable phosphor sheet, i.e., an image signal bearing a transmitted image of a human body, along a prescribed direction across the image, determining the degree of matching between a pattern of the distribution and a plurality of basic signal distribution patterns predefined of imaged postures of the image, and determining the imaged posture of the image based on the degree of matching.

The degree of matching between the signal distribution pattern and the reference signal distribution pattern can be checked by any of various known pattern matching processes.

According to the present invention, a fifth method of determining the imaged posture of a medical image comprises the steps of determining a distribution of an image signal read from a stimulable phosphor sheet, i.e., an image signal bearing a transmitted image of a human body, along a prescribed direction across the image, determining a function approximating a pattern of the distribution, thereafter, determining a derivative of second order of the function, checking whether the derivative of second order is of a positive or negative value in a predetermined region in the image, and determining the imaged posture of the image based on whether the derivative of second order is of a positive or negative value.

According to the present invention, there is also provided a sixth method of determining the imaged posture of a medical image, comprising the steps of determining a distribution of an image signal read from a stimulable phosphor sheet, i.e., an image signal bearing a transmitted image of a human body, along a prescribed direction across the image, detecting whether a pattern of the distribution is basically of a one-valley form or a two-valley form, and determining the imaged posture of the image based on whether a pattern of the distribution is basically of a one-valley form or a two-valley form.

Now, radiation images of the chest of a human body will be considered. A front chest image which is taken by imaging the chest from its front side has a signal distribution in a horizontal direction along a straight line L (FIGS. 2A and 2B), as shown in FIG. 3A, and a side chest image which is taken by imaging the chest from its lateral side has a signal distribution in the horizontal direction along the line L, as shown in FIG. 3B. The front chest image (see FIG. 2A) includes in its horizontally central area the thoracic vertebra K and the mediastinum which are less permeable to radiation. The side chest image (see FIG. 2B) includes in its horizontally central area the lung P which is more permeable to radiation and also includes in its laterally opposite end areas the thoracic vertebra K and the heart C which are less permeable to radiation. The signal distribution in the horizontal direction across the image may be a signal distribution of an array of pixels along the straight line L in FIGS. 2A and 2B, or may be a distribution of the sum or average of signal values of pixel rows extending substantially perpendicularly to the line L.

If the signal distributions are as shown in FIGS. 3A and 3B, the accumulated values used in the first method are as shown in FIGS. 4A and 4B for the front and side chest images. The rate of change of the accumulated values in the vicinity of the horizontally central area of the image is considerably small for the accumulated value pattern of FIG. 4A, and is considerably large for the accumulated value pattern of FIG. 4B. Therefore, if the rate of change of the accumulated value pattern is relatively small, the chest image can be judged as the front chest image, and if the rate of change of the accumulated value pattern is relatively large, the chest image can be judged as the side chest image.

The pattern of the signal distribution shown in FIG. 3A has low signal values near the central region of the image, whereas the pattern of the signal distribution shown in FIG. 3B has high signal values near the central region of the image. The separation, used in the second method of the invention, of the signal distribution of FIG. 3A is larger than the separation of the signal distribution of FIG. 3B. If, therefore, the separation of the signal distribution is relatively large, the image can be determined as the front chest image, and if the separation of the signal distribution is relatively small, the image can be determined as the side chest image.

Where the signal distributions are as illustrated in FIGS. 3A and 3B, the average signal value, used in the third method of the invention, in the vicinity of the central region of the image is relatively low for the front chest image and relatively high for the side chest image. Accordingly, if the average signal value is relatively low, the image can be determined as the front chest image, and if the average signal value is relatively high, the image can be determined as the side chest image.

The signal distribution patterns as shown in FIGS. 3A and 3B, which are used in the fourth method of invention, are stored in advance in a memory means respectively as a reference signal distribution pattern for front chest images and a reference signal distribution pattern for side chest images. The degree of matching between a distribution pattern of an image signal bearing a front chest image or a side chest image and the above two reference signal distribution patterns. If the image signal distribution pattern better matches the reference signal distribution pattern shown in FIG. 3A than the reference signal distribution pattern shown in FIG. 3B, then the image borne by the image signal is judged as the front chest image. If image signal distribution pattern matches the reference signal distribution pattern of FIG. 3B better than the reference signal distribution pattern of FIG. 3A, then the image borne by the image signal is judged as the side chest image.

When the signal distribution patterns are approximated by a function used in the fifth method of the invention, the derivative of second order of the function is of a positive value in a region in which the function or the signal distribution pattern is downwardly convex, and the derivative of second order of the function is of a negative value in a region in which the function or the signal distribution pattern is upwardly convex. The signal distribution pattern shown in FIG. 3A is downwardly convex in the vicinity of the horizontal center in the image, and the signal distribution pattern shown in FIG. 3B is upwardly convex in the vicinity of the horizontal center in the image. The derivative of second order is checked for its sign in the region near the horizontal center in the chest images. If the derivative of second order is positive, then the chest image is determined as the front chest image, and if the derivative of second order is negative, then the chest image is determined as the side chest image.

Moreover, the signal distribution pattern of FIG. 3A is basically of a one-valley form having higher signal values at lefthand and righthand ends of the image, whereas the signal distribution pattern of FIG. 3B is basically of a two-valley form having higher signal values at the center in the image. In the sixth method of the invention, whether a signal distribution pattern is of a one-valley form or a two-valley form is checked. If the signal distribution pattern is basically of a one-valley form, the chest image is determined as the front chest image, and if the signal distribution pattern is basically of a two-valley form, the chest image is determined as the side chest image.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4A and 4B are graphs showing patterns of accumulated density values in the density distributions shown in FIGS. 3A and 3B;

FIG. 5 is a block diagram of an apparatus for carrying out a first method of the present invention;

FIG. 8 is a block diagram of an apparatus for carrying out a second method of the present invention;

FIG. 11 is a block diagram of an apparatus for carrying out the third method of the present invention;

FIG. 12C is a graph showing, by way of example, an actual image density distribution pattern;

FIG. 13 is a block diagram of an apparatus for carrying out a fourth method of the present invention;

FIGS. 14A and 14B are graphs showing density distributions in a certain direction of radiation images which are obtained by imaging an object at different postures, and also showing areas where the sign of a derivative of second order is checked according to a fifth method of the present invention.

DESCRIPTION OF THE PREFERRED EMBODIMENTS

Figure 1:
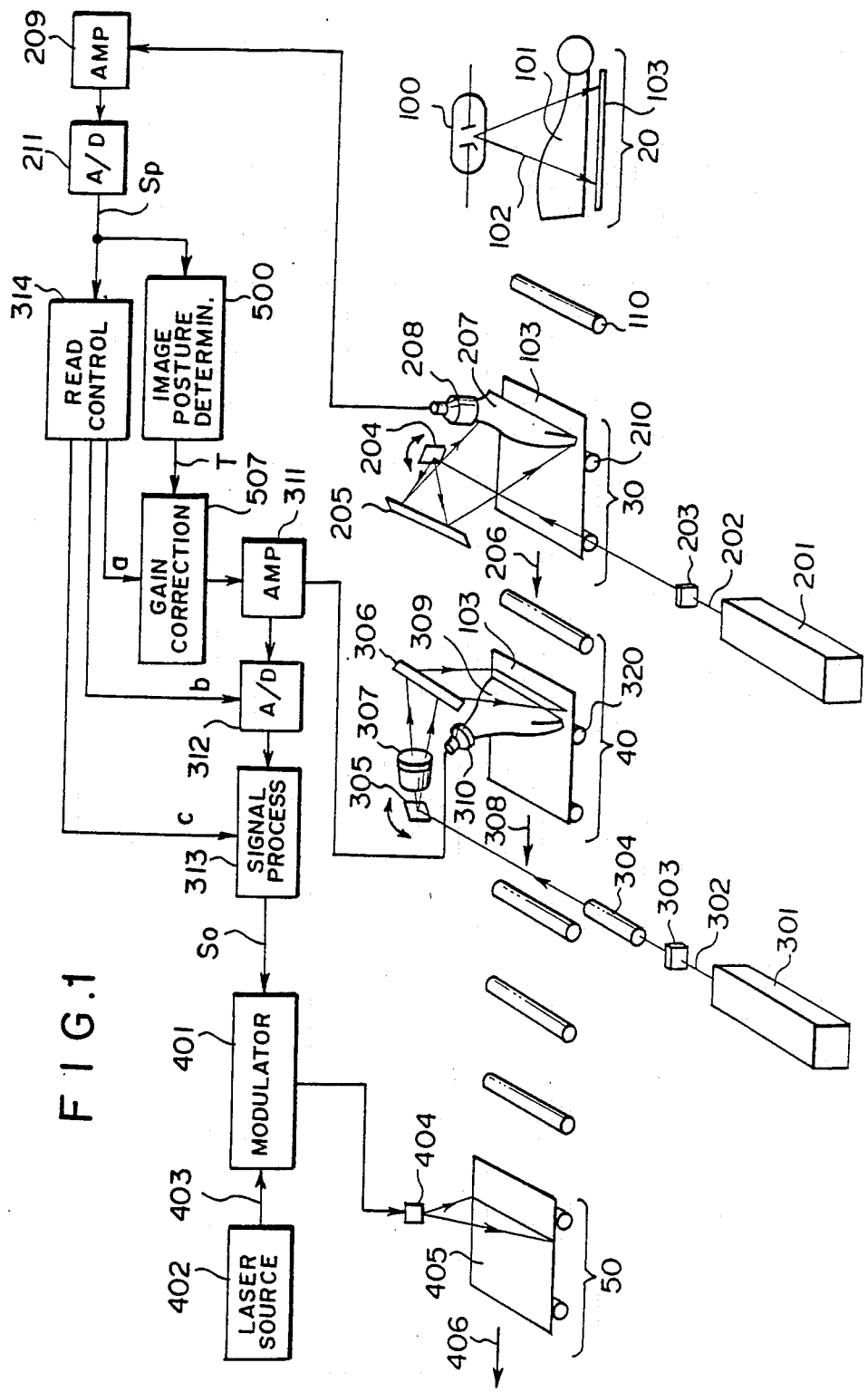
FIG. 1 is a schematic perspective view, partly in block form, of a radiation image recording and reproducing system for determining an imaged posture according to a method of the present invention.

FIG. 1 shows, by way of example, a radiation image recording and reproducing system for determining an imaged posture of a human body according to a method of a first embodiment of the present invention. The radiation image recording and reproducing system basically comprises a radiation image generating unit 20, an preliminary reading unit 30, a main reading unit 40, and an image reproducing unit 50. In the radiation image generating unit 20, a radiation 102 is emitted from a radiation source 100 such as an X-ray tube toward an object 101 such as a human body under examination. The radiation 102 passes through the object 101 and is then applied to a stimulable phosphor sheet 103 capable of storing radiation energy for thereby recording the transmitted-radiation image information of the object 101 on the stimulable phosphor sheet 103.

The stimulable phosphor sheet 103 with the transmitted-radiation image information of the object 101 being recorded thereon is then fed to the preliminary reading unit 30 by a sheet feed means 110 such as a feed roller. In the preliminary reading unit 30, a laser beam 202 emitted from a preliminary reading laser source 201 passes through a filter 203 which cuts off the wavelength range of light which will be emitted from the stimulable phosphor sheet 103 upon exposure to the laser beam 202, and then is linearly deflected in a main scanning direction by a light deflector 204 such as a galvanometer mirror, after which the laser beam 202 is reflected by a plane mirror 205 onto the stimulable phosphor sheet 103. The laser beam 202 emitted as stimulating light from the laser source 201 has a waveform range selected so as not to overlap the waveform range of light emitted from the stimulable phosphor sheet 103. The stimulable phosphor sheet 103 is simultaneously fed for auxiliary scanning in the direction of the arrow 206 by a sheet feed means 210 such as feed rollers. As a result, the laser beam 202 is applied two-dimensionally to the entire surface of the stimulable phosphor sheet 103. The intensity of the laser beam 202 emitted from the laser source 201, the diameter of the laser beam 202, the scanning speed of the laser beam 202, and the speed of travel of the stimulable phosphor sheet 103 in the auxiliary scanning direction are selected so that the energy of the stimulating light (laser beam 202) in the preliminary reading mode will be lower than the energy of stimulating light emitted in a main reading mode (described later).

When the laser beam 202 is applied to the stimulable phosphor sheet 103 in the preliminary reading unit 30, the stimulable phosphor sheet 103 gives off light in an amount proportional to the amount of radiation energy stored therein, and the emitted light enters a preliminary reading light guide 207. The light is guided by the light guide 207 to reach a light detector 208 such as a photomultiplier. The light detector 207 has a light detecting surface to which there is attached a filter that passes only the wavelength range of the emitted light from the stimulable phosphor sheet 103, but cuts off the wavelength range of the stimulating light from the laser source 201. Therefore, the light detector 207 can detect only the light emitted from the stimulable phosphor sheet 103. The detected light is then converted to an electric signal bearing recording information of the stored radiation image, and the electric signal is applied by an amplifier 209. The amplified output signal from the amplifier 209 is converted by an A/D converter 211 to a digital signal, which is then applied as a preliminary reading image signal Sp to a main reading control circuit 314 of the main reading unit 40. The main reading control circuit 314 determines a read-out gain setting a, a recording scale factor setting b, and a reproduced image processing condition setting c through histogram analysis, for example, based on the recording information represented by the preliminary reading image signal Sp.

When the preliminary reading mode is completed, the stimulable phosphor sheet 103 is fed into the main reading unit 40. In the main reading unit 40, a laser beam 302 emitted from a main reading laser source 301 passes through a filter 303 which cuts off the wavelength range of light which will be emitted from the stimulable phosphor sheet 103 upon exposure to the laser beam 302, and then is accurately adjusted in its diameter by a beam expander 304. The laser beam 302 is then linearly deflected in a main scanning direction by a light deflector 305 such as a galvanometer mirror, after which the laser beam 302 is reflected by a plane mirror 306 onto the stimulable phosphor sheet 103. Between the light deflector 305 and the plane mirror 306, there is disposed an $f\theta$ lens 307 for uniformizing the beam diameter of the laser beam 302 which scans the stimulable phosphor sheet 103. The stimulable phosphor sheet 103 is simultaneously fed for auxiliary scanning in the direction of the arrow 308 by a sheet feed means 320 such as feed rollers. As a result, the laser beam 302 is applied two-dimensionally to the entire surface of the stimulable phosphor sheet 103. When the laser beam 302 is applied to the stimulable phosphor sheet 103 in the main reading unit 40, the stimulable phosphor sheet 103 gives off light in an amount proportional to the amount of radiation energy stored therein, and the emitted light enters a main reading light guide 309. The light is guided by the light guide 309 while repeating total reflection therein to reach a light detector 310 such as a photomultiplier. The light detector 310 has a light detecting surface to which there is attached a filter that selectively passes only the wavelength range of the emitted light from the stimulable phosphor sheet 103. Therefore, the light detector 310 can detect only the light emitted from the stimulable phosphor sheet 103.

The light detector 310 photoelectrically detects the emitted light which represents the radiation image recorded on the stimulable phosphor sheet 103. The output signal of the light detector 310 is then amplified to an electric signal of a suitable level by an amplifier 311 with its read-out gain being set by the read-out gain setting a determined by the control circuit 314. The amplified electric signal is applied to an A/D converter 312 which converts the signal to a digital signal with a recording scale factor suitable for a signal variation width based on the recording scale factor setting b. The digital signal is applied to a signal processing circuit 313. The signal processing circuit 313 processes the digital signal for image processing such as gradation processing, for example, based on the reproduced image processing condition setting c so that a well-observable radiation image can be reproduced.

A read-out image signal (main reading image signal) So issued from the signal processing circuit 313 is applied to a light modulator 401 of the image reproducing unit 50. In the image reproducing unit 50, a laser beam 403 emitted from a recording laser source 402 is modulated by the main reading image signal So from the signal processing circuit 313, and the modulated laser beam 403 is deflected by a scanning mirror 404 to scan a photosensitive sheet 405 such as a photographic film. In synchronism with the scanning by the modulated laser beam 403, the photosensitive sheet 405 is fed in a direction (indicated by the arrow 406) normal to the direction in which the photosensitive sheet 405 is scanned by the modulated laser beam 403. Therefore, a radiation image based on the main reading image signal So is recorded on the photosensitive sheet 405. The radiation image may otherwise be reproduced by display on a CRT or in any of various other known ways.

Figure 3A:
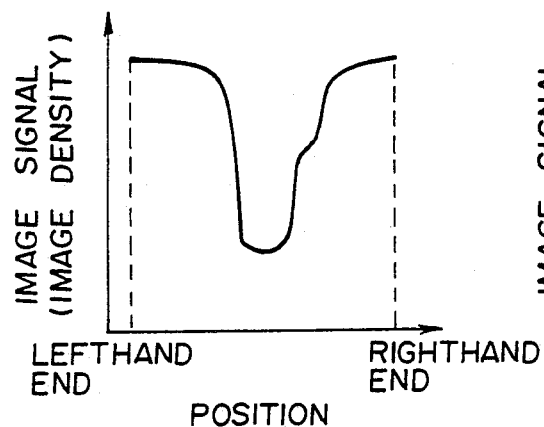
FIGS. 3A and 3B are graphs showing density distributions in a certain direction of radiation images which are obtained by imaging an object at different postures.
Figure 3B:
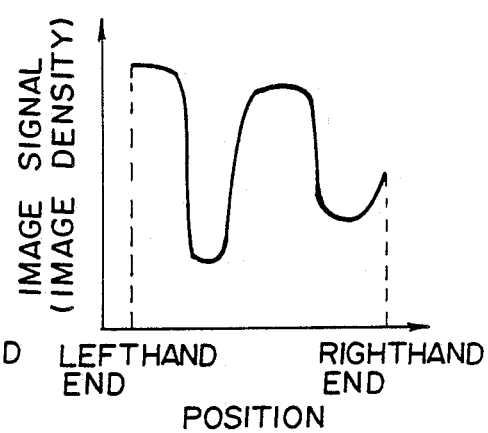
Figure 6:
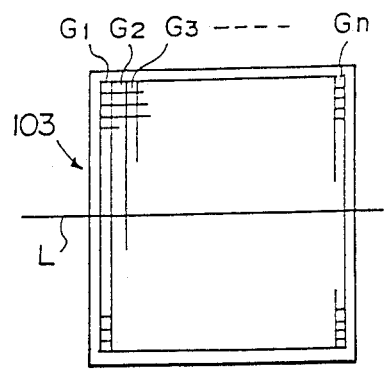
FIG. 6 and 7 are views explaining the manner in which a signal is extracted to find a density distribution according to the present invention.

A method according to a first embodiment of the present invention for automatically determining the imaged posture of the object will now be described below. The preliminary reading image signal Sp issued from the A/D converter 211 is applied to an imaged posture determining circuit 500 as well as the main reading control circuit 314. FIG. 5 shows the imaged posture determining circuit 500 in detail. The imaged posture determining circuit 500 has a signal extracting-/adding circuit 511 which, in response to the main reading image signal Sp supplied thereto, extracts signals for respective vertical pixel rows G1, G2, G3, . . . Gn (see FIG. 6) which extend vertically across the image perpendicularly to a straight line L, from the main reading image signal Sp, and adds the extracted signals for the pixel rows to obtain n sum signals H1, H2, H3, . . . Hn. Each of the sum signals indicates the total density value for one of the pixel rows, and the entire sum signals represent a density distribution horizontally across the image. The sum signals may however be replaced with average values of the extracted signals for the respective pixel rows. The average values also represent a density distribution horizontally across the image. If the image recorded on the stimulable phosphor sheet 103 is the image of a chest, the signal (density) distribution horizontally across the image is as shown in FIG. 3A when the chest is imaged from its front side and as shown in FIG. 3B when the chest is imaged from its lateral side. The following description is directed to analysis of such chest images by way of example. The n sum signals H=H1, H2, H3, . . . Hn are fed to a signal accumulator 512. The signal accumulator 512 first determines an accumulated value H1 up to the pixel row G1, then an accumulated value (H1+H2) up to the pixel row G2, then an accumulated value (H1+H2+G3) up to the pixel row G3, and so on until finally an accumulated value (H1+H2+H3+ . . . +Hn) up to the pixel row Gn is determined. The accumulated signal values (which indicate accmulated density values) thus determined are as shown in FIGS. 4A and 4B for the imaging of the chest from its front and lateral sides, respectively. Information Ha representing the accumulated value is fed to a rate-of-change calculating unit 513 which determines the rate of change r of the accumulated value represented by the information Ha, in a region I (see FIGS. 4A and 4B) in the horizontally central area of the image. The rate of change r may be defined by the value of $(\beta - \alpha)$ between the accumulated signal values $\alpha, \beta$ at the ends of the region I. The region I may be defined between positions indicated by 40% and 60% of the image width, but may appropriately be defined otherwise dependent on the image to be analyzed, or may be confined to a point in the image.

Information indicating the rate of change r is then sent to a determining unit 514 which compares a reference value Th supplied from a reference setting unit 515 and the rate of change r. If r>Th, then the image borne by the preliminary reading image signal Sp is determined as a side chest image, and the determining unit 512 issues a corrective signal T. If r≦Th, then the image borne by the preliminary reading image signal Sp is determined as a front chest image, and the determining unit 514 issues no corrective signal. The corrective signal T is fed to a gain correcting circuit 507 shown in FIG. 1. In response to the corrective signal T, the gain correcting circuit 507 corrects the read-out gain setting a so that the read-out gain will be lowered. As described above, if the image reading conditions and the image processing conditions remain constant, the density at the area of the thoracic vertebra K of the side chest image is higher than that of the front chest image. When the rate of change r is relatively large, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K of the reproduced side chest image is substantially equalized to the density at the area of the thoracic vertebra K of the reproduced front chest image. The degree to which the read-out gain may be corrected may be determined experimentally or empirically.

In the above embodiment, the sum signals for the respective pixel rows are produced from the image signal Sp. However, the image signal Sp for each pixel row may be converted to a binary signal by comparison with a given threshold, and the binary signal data may be used for effecting the above process. (This alternative may be employed in methods according to other embodiments described below.)

Figure 2A:
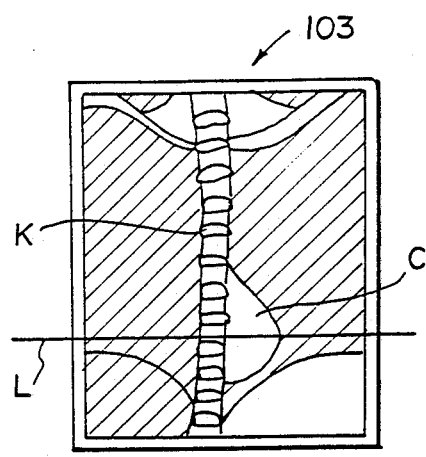
FIGS. 2A and 2B are views of radiation images showing different imaged postures of an object.
Figure 2B:
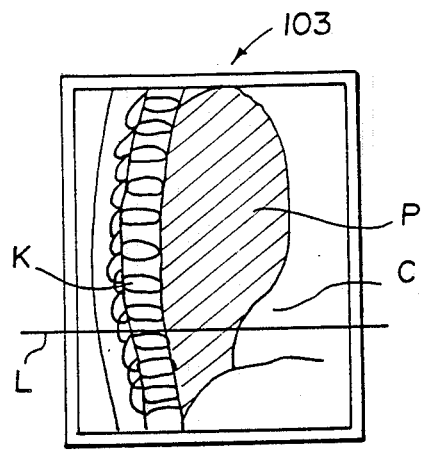
Figure 7:
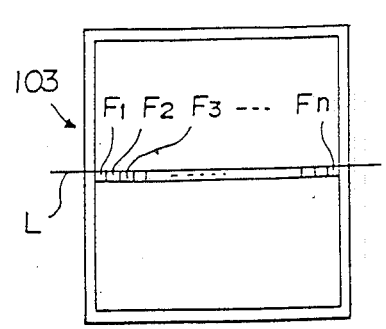

The signal distribution along the straight line L in FIGS. 2A and 2B is determined by calculating the sum or average of the image signals for the respective pixel rows G1, G2, G3, . . . Gn. However, as shown in FIG. 7, the signal distribution may be determined by signal values of an array of pixels F1, F2, F3, . . . Fn along the straight line L since such signal values represent the signal distribution. (This also holds true for methods according to other embodiments described below.)

In the aforsaid embodiment, the front chest image is read at the read-out gain determined by the main reading control circuit 314, and the side chest image is read at the read-out gain which is corrected so as to be lower. Conversely, the side chest image may be read at the read-out gain determined by the main reading control circuit 314, and the front chest image is read at the read-out gain which is corrected so as to be higher. The density of the reproduced image may be adjusted by varying the read-out gain, as described above, and also by varying the conditions for the recording scale factor in the A/D converter 312, or varying the conditions for the gradation processing in the signal processing circuit 313. These alternative adjusting processes may be combined with each other. (This also holds true for methods according to other embodiments described below.)

The method of the first embodiment of the present invention may be used to determine other imaged postures than the imaged postures of front and side chest images, and also imaged postures of other body parts. More specifically, when a certain body part is imaged at different postures, it is highly likely for the rate of change of the accumulated values of one of the body part images to vary greatly from the rate of change of the accumulated values of the other body part image in a certain area in the image. The imaged postures can therefore be determined by detecting the magnitude of the rate of change.

Figure 9:
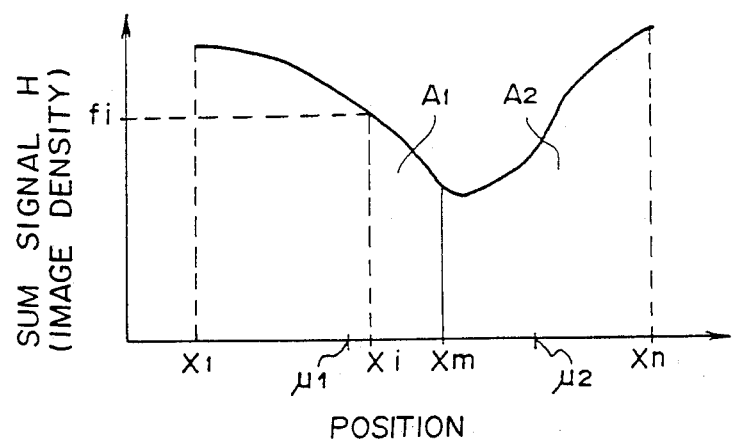
FIG. 9 is a graph explaining class separation in the second method.

A method according to a second embodiment will be described below. FIG. 8 shows in detail an imaged posture determining circuit 500A which can be used in the system of FIG. 1 in place of the imaged posture determining circuit 500 shown in FIG. 5. The imaged posture determining circuit 500A has a signal extracting/adding circuit 521 which, in response to the main reading image signal Sp supplied thereto, extracts signals for respective pixel rows G1, G2, G3, ... Gn (see FIG. 6) which extend vertically across the image perpendicularly to a straight line L, from the main reading image signal Sp, and adds the extracted signals for the pixel rows to obtain n sum signals H1, H2, H3, ... Hn. Each of the sum signals indicates the total density value for one of the pixel rows, and the entire sum signals represent a density distribution horizontally across the image, as with the method of the first embodiment. If the image recorded on the stimulable phosphor sheet 103 is the image of a chest, the signal (density) distribution horizontally across the image is as shown in FIG. 3A when the chest is imaged from its front side and as shown in FIG. 3B when the chest is imaged from its lateral side. The following description is directed to analysis of such chest images by way of example. The n sum signals H=H1, H2, H3, ... Hn are fed to a separation calculating unit 523. The separation calculating unit 523 determines the maximum value Rmax of class separation R used in determination analysis as the separation of the signal distribution indicated by the information H. There is established a point Xm (FIG. 9) by which the pixel rows G1–Gn are divided into two groups or areas A1, A2, and it is assumed that the ratios of the accumulated signal values in the areas A1, A2 are indicated by w1, w2 ($w1+w2=1$), the average weighting positions for the areas A1, A2 are indicated by $\mu 1$, $\mu 2$, and the dispersion of the signal distribution is expressed by $\sigma 2$. The maximum value Rmax of class separation R can be defined by the maximum value of:

$$R = w1w2(\mu 1 - \mu 2)^2/\delta^2$$

which varies according to m. The average positions $\mu 1$, $\mu 2$ are given by:

$$u1 = \frac{1}{\sum_{i=1}^{m} \cdot fi} \sum_{i=1}^{m} \cdot Xi \cdot fi$$

$$u2 = \frac{1}{\sum_{i=m+1}^{n} \cdot fi} \sum_{i=m+1}^{n} \cdot Xi \cdot fi$$

Information Sr indicating the maximum value Rmax of class separation R is then sent to a determining unit 524 which compares a reference value Th supplied from a reference setting unit 525 and the maximum value Rmax. If Rmax≦Th, then the image borne by the preliminary reading image signal Sp is determined as a side chest image, and the determining unit 524 issues a corrective signal T. If Rmax>Th, then the image borne by the preliminary reading image signal Sp is determined as a front chest image, and the determining unit 524 issues no corrective signal. The corrective signal T is fed to the gain correcting circuit 507 shown in FIG. 1. As with the first embodiment, in response to the corrective signal T, the gain correcting circuit 507 corrects the read-out gain setting a so that the read-out gain will be lowered. When the class separation R is relatively small, i.e., when the side chest image is read, the overall level of the main reading image signal So is lowered. Therefore, the entire density of the reproduced radiation image recorded on the photosensitive sheet 405 is lowered. As a result, the density at the area of the thoracic vertebra K of the reproduced side chest image is substantially equalized to the density at the area of the thoracic vertebra K of the reproduced front chest image.

The separation of the signal distribution may be defined by a correlative standard or a least square standard rather than the class separation.

The method of the second embodiment of the present invention may be used to determine other imaged postures than the imaged postures of front and side chest images, and also imaged postures of other body parts. More specifically, when a certain body part is imaged at different postures, it is highly likely for the separation of the signal distribution of one body part image to vary greatly from the separation of the signal distribution of the other body part image. The imaged postures can therefore be determined by determining the magnitude of the separation.

Figure 10A:
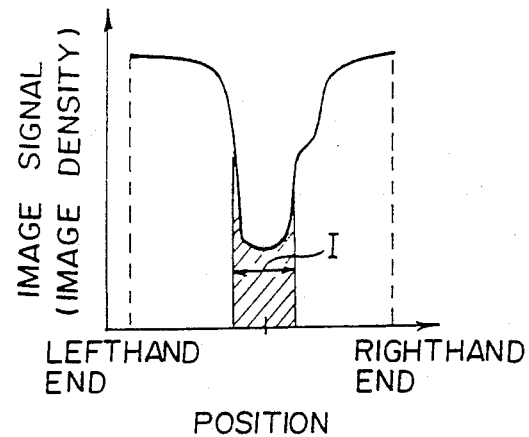
FIGS. 10A and 10B are graphs showing density distributions in a certain direction of radiation images which are obtained by imaging an object at different postures, and also showing central areas in that direction according to a third method of the present invention.
Figure 10B:
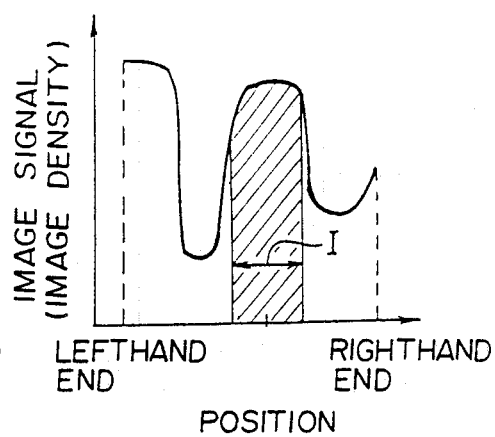

A method according to a third embodiment will be described below. FIG. 11 shows an imaged posture determining circuit 500B which can be used in the system of FIG. 1 in place of the imaged posture determining circuit 500 illustrated in FIG. 5. The imaged posture determining circuit 500B has a signal extracting/adding circuit 531 which, in response to the main reading image signal Sp supplied thereto, extracts signals for respective pixel rows G1, G2, G3, ... Gn (see FIG. 6) which extend vertically across the image perpendicularly to a straight line L, from the main reading image signal Sp, and adds the extracted signals for the pixel rows to obtain n sum signals H1, H2, H3, ... Hn. Each of the sum signals indicates the total density value for one of the pixel rows, and the entire sum signals represent a density distribution horizontally across the image, as with the method of the first embodiment. If the image recorded on the stimulable phosphor sheet 103 is the image of a chest, the signal (density) distribution horizontally across the image is as shown in FIG. 3A when the chest is imaged from its front side and as shown in FIG. 3B when the chest is imaged from its lateral side. The following description is directed to analysis of such chest images by way of example. The n sum signals H=H1, H2, H3, ... Hn are fed to an accumulated value adder 532. The accumulated value adder 532 is responsive to an addition region indication signal m from a region indicator 533 for adding the sum signals H in the region I (see FIGS. 10A and 10B), which is indicated by the signal m, in the horizontally central area of the image. Assuming that the region I is indicated as lying between the pixel rows Gm and GM, the accumulated value adder 532 executes the addition $r=Hm+Hm+1+...HM-1+HM$. The sum r is representative of the average density of the radiation image in the central region I. Information indicative of the sum r is fed to a determining unit 534. The region I may be defined between positions indicated by 40% and 60% of the image width, but may appropriately be defined otherwise dependent on the image to be analyzed, or may be confined to a point in the image.

The determining unit 534 compares a reference value Th supplied from a reference setting unit 535 and the sum r. If r>Th, then the image borne by the preliminary reading image signal Sp is determined as a side chest image, and the determining unit 512 issues a corrective signal T. If r≦Th, then the image borne by the preliminary reading image signal Sp is determined as a front chest image, and the determining unit 534 issues no corrective signal. The corrective signal T is fed to the gain correcting circuit 507 shown in FIG. 1. As with the first embodiment, in response to the corrective signal T, the gain correcting circuit 507 corrects the read-out gain setting a so that the read-out gain will be lowered. When the sum r is relatively large, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K of the reproduced side chest image is substantially equalized to the density at the area of the thoracic vertebra K of the reproduced front chest image.

The method of the third embodiment of the present invention may be used to determine other imaged postures than the imaged postures of front and side chest images, and also imaged postures of other body parts. More specifically, when a certain body part is imaged at different postures, it is highly likely for the average value in the central area of the signal distribution of one body part image to vary greatly from the average value in the central area of the signal distribution of the other body part image. The imaged postures can therefore be determined by determining the magnitude of the average value.

A method according to a fourth embodiment will be described below. FIG. 13 shows an imaged posture determining circuit 500C which can be used in the system of FIG. 1 in place of the imaged posture determining circuit 500 shown in FIG. 5. The imaged posture determining circuit 500C has a signal extracting/adding circuit 541 which, in response to the main reading image signal Sp supplied thereto, extracts signals for respective pixel rows G1, G2, G3, ... Gn (see FIG. 6) which extend vertically across the image perpendicularly to a straight line L, from the main reading image signal Sp, and adds the extracted signals for the pixel rows to obtain n sum signals H1, H2, H3, ... Hn. Each of the n sum signals indicates the total density value for one of the pixel rows, and the entire sum signals represent a density distribution horizontally across the image, as with the method of the first embodiment. If the image recorded on the stimulable phosphor sheet 103 is the image of a chest, the signal (density) distribution horizontally across the image is of a general pattern as shown in FIG. 3A when the chest is imaged from its front side and as shown in FIG. 3B when the chest is imaged from its lateral side. The following description is directed to analysis of such chest images by way of example.

Figure 12A:
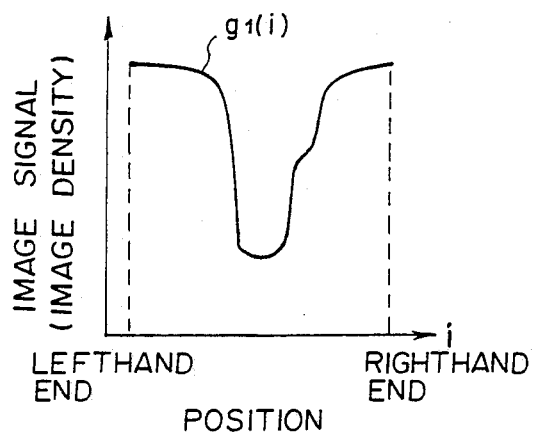
FIGS. 12A and 12B are graphs showing, by way of example, basic patterns of density distributions in a certain direction of radiation images which are obtained by imaging an object at different postures, and also showing functions according to a third method of the present invention.
Figure 12B:
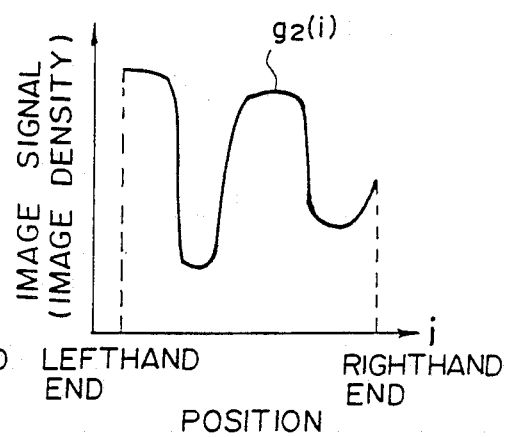

The general signal distribution patterns shown in FIGS. 3A and 3B can be determined by finding the sum signals H1, H2, H3, ... Hn based on preliminary reading image signals Sp relative to several typical front and side chest images, and sending the sum signals to a function generator 542 by which the sum signals are averaged and smoothed. The function generator 542 produces functions g1(i), g2(i) which approximate the typical signal distribution patterns thus found (see FIGS. 12A and 12B). (i indicates a horizontal position in the image.) The functions can be generated as being composed of a multinomial of higher degree by using, for example, the regression analysis process. The functions g1(i), g2(i) are stored in a memory means 545 as indicating reference signal distribution patterns of the front and side chest images.

For determining the imaged posture of each radiation image, the sum signals H1, H2, H3, ... Hn are sequentially produced in the signal extracting/adding unit 541 based on the preliminary reading image signal Sp representing the radiation image. The distribution pattern of actual sum signals of each image, i.e., the density distribution pattern thereof, is as shown in FIG. 12C, for example, and can be defined as a function f(i) of the pixel position i. Information F indicating the function f(i) is then delivered to a mismatch calculating unit 543, which finds the degree of a mismatch between a signal distribution pattern represented by the information F and the above two reference signal distribution patterns. More specifically, when supplied with the information F, the mismatch calculating unit 543 receives items of information J1, J2 indicating the functions g1(i), g2(i) from the memory means 545, and determines the degrees of mismatches according to the following equations:

$$S1 = \sum_{i=1}^{N} \{f(i) - g1(i)\}^2$$

$$S2 = \sum_{i=1}^{N} \{f(i) - g2(i)\}^2$$

The information thus determined as indicating the mismatch degrees S1, S2 is then sent to a determining unit 544.

If $S1 > S2$, then the determining unit 544 determines that the image borne by the preliminary reading image signal Sp is a side chest image, and issues a corrective signal T. If $S1 < S2$, then the image borne by the preliminary reading image signal is judged as a front chest image, and no corrective signal is issued. More specifically, if $S1 < S2$, the degree of a mismatch between the functions f(i) and the function g1(i) is smaller than the degree of a mismatch between the functions f(i) and the function g2(i). Stated otherwise, the function f(i) matches the function g1(1) better than the function g2(i). Therefore, the signal distribution pattern produced by the preliminary reading image signal Sp can be judged as better matching the reference signal distribution pattern of FIG. 12A than the reference signal distribution pattern of FIG. 12B.

The corrective signal T is fed to the gain correcting circuit 507 shown in FIG. 1. In response to the corrective signal T, the gain correcting circuit 507 corrects the read-out gain setting a so that the read-out gain will be lowered, as with the first embodiment When $S1 > S2$, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K of the reproduced side chest image is substantially equalized to the density at the area of the thoracic vertebra K of the reproduced front chest image.

$$S = \sum_{i=1}^{N} |f(i) - g(i)|, \text{ or}$$

the maximum value from the group of f(i)−g(1), f(2)−g(2), ... f(N)-g(N).

The method of the fourth embodiment of the present invention may be used to determine other imaged postures than the imaged postures of front and side chest images, and also imaged postures of other body parts. More specifically, when a certain body part is imaged at different postures, it is highly likely for the signal distribution patterns of the body part images to have mutually different basic signal distribution patterns. Therefore, the matching degree between those basic signal distribution patterns and the distribution pattern of an actual image signal is determined, and the imaged postures can be determined according to the determined matching degree.

Figure 15:
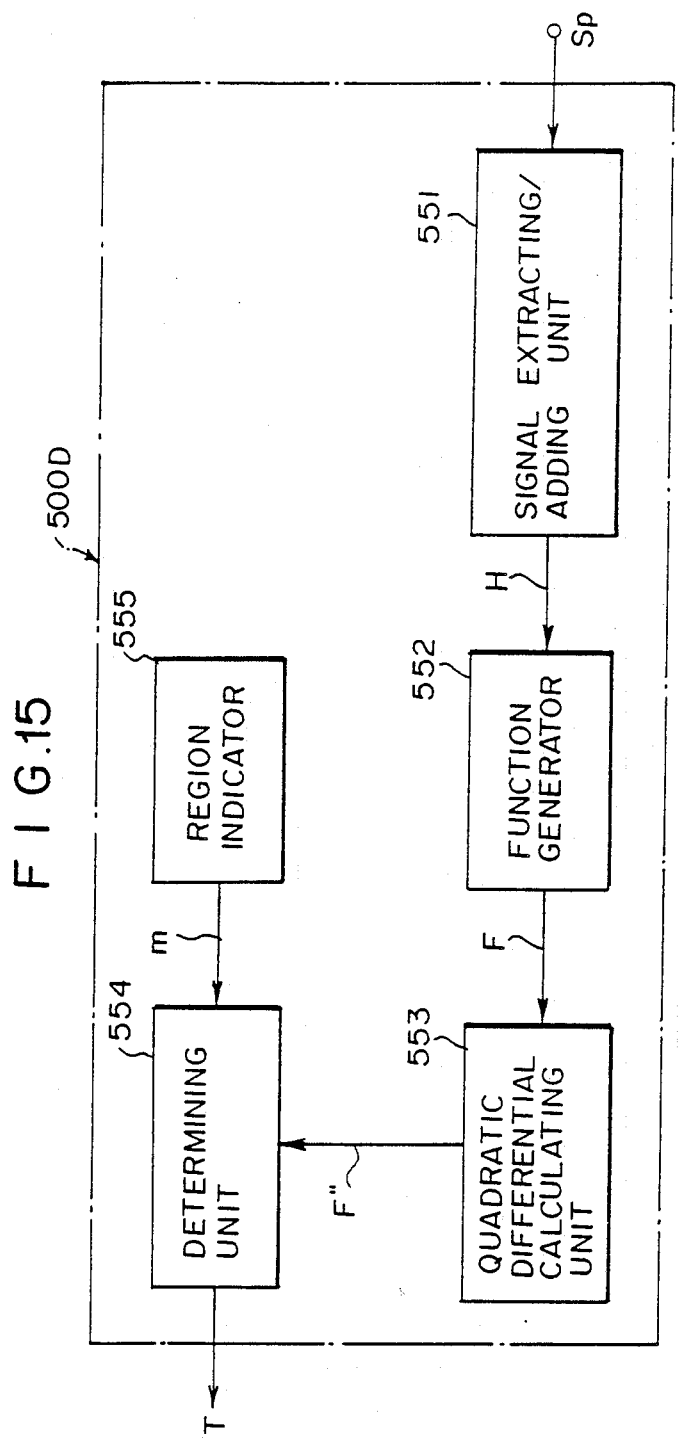
FIG. 15 is a block diagram of an apparatus for carrying out the fifth method of the present invention.

A method according to a fifth embodiment will be described below. FIG. 15 shows an imaged posture determining circuit 500D which can be used in the system of FIG. 1 in place of the imaged posture determining circuit 500 shown in FIG. 5. The imaged posture determining circuit 500D has a signal extracting/adding circuit 551 which, in response to the main reading image signal Sp supplied thereto, extracts signals for respective pixel rows G1, G2, G3, ... Gn (see FIG. 6) which extend vertically across the image perpendicularly to a straight line L, from the main reading image signal Sp, and adds the extracted signals for the pixel rows to obtain n sum signals H=H1, H2, H3, ... Hn. Each of the sum signals indicates the total density value for one of the pixel rows, and the entire sum signals represent a density distribution horizontally across the image, as with the method of the first embodiment. If the image recorded on the stimulable phosphor sheet 103 is the image of a chest, the signal (density) distribution horizontally across the image is as shown in FIG. 3A when the chest is imaged from its front side and as shown in FIG. 3B when the chest is imaged from its lateral side. The following description is directed to analysis of such chest images by way of example. The n sum signals H1, H2, H3, ... Hn are fed to a function generator 552. The function generator 552 produces a function f(X) which approximates the signal distribution pattern indicated by the information H (X indicates a horizontal position in the image). The function f(X) can be generated as being composed of a multinomial of higher degree by using, for example, the regression analysis process. Information F representing the function f(X) is then supplied to a quadratic differential calculating unit 553, which quadratically differentiates the function f(X) to find a derivative of second order f"(X). Information F" indicative of the derivative of second order f"(X) is sent to a determining unit 554, which is supplied with information m indicating a horizontally central position Xm (see FIGS. 14A and 14B) in the image. The determining unit 554 determines a value f"(Xm) which the derivative of second order f"(X) takes at the central position Xm. If the value of f"(Xm) is negative, then the determining unit 554 determines that the image borne by the preliminary reading image signal Sp is a side chest image, and issues a corrective signal T. If the value of f"(Xm) is positive, then the image borne by the preliminary reading image signal is judged as a front chest image, and no corrective signal is issued. The corrective signal T is fed to the gain correcting circuit 507 shown in FIG. 1. In response to the corrective signal T, the gain correcting circuit 507 corrects the read-out gain setting a so that the read-out gain will be lowered, as with the first embodiment. When the value of f"(Xm) is negative, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K of the reproduced side chest image is substantially equalized to the density at the area of the thoracic vertebra K of the reproduced front chest image.

The value to be put in the derivative of second order f"(X) is not limited to the central position Sm, but may appropriately be selected according to a typical signal (density) distribution pattern of an image to be analyzed.

The method of the fifth embodiment of the present invention may be used to determine other imaged postures than the imaged postures of front and side chest images, and also imaged postures of other body parts. More specifically, when a certain body part is imaged at different postures, it is highly likely for the signal distribution pattern of one of the body part images to be donwardly convex and for the signal distribution pattern of the other body part image to be upwardly convex in a certain region. Therefore, the imaged postures can be determined according to the sign of the derivative of second order in this region.

A method according to a sixth embodiment of the present invention will be described below. The method of the sixth embodiment determines an imaged posture by checking whether a signal distribution pattern as shown in FIG. 3A or 3B is of a one-valley form or a two-valley form. Whether a signal distribution pattern is of a one-valley form or a two-valley form can be ascertained by, for example, checking the rate of change of the accmulated values indicated by the information Ha (first embodiment) in the region I (see FIGS. 4A and 4B) at the horizontal center in the image. More specifically, if a signal distribution pattern is of a one-valley shape as shown in FIG. 3A with the signal value being low in the vicinity of the horizontal center in the image, then the rate of change r of the accumulated signal values near the central area is relatively small. If a signal distribution pattern is of a two-valley shape as shown in FIG. 3B with the signal value being high in the vicinity of the horizontal center in the image, then the rate of change r of the accumulated signal values near the central area is relatively large. Therefore, whether the signal distribution pattern is of a one-valley type or a two-valley type can be known from the rate of change r.

In the system shown in FIG. 5, the rate of change r produced by the rate-of-change calculating unit 513 and the reference value Th from the reference setting unit 515 are compared. If r>Th, then the signal distribution pattern is judged as being of a two-valley form, i.e., the image borne by the preliminary reading image signal Sp is judged as a side chest image, and a corrective signal T is issued. If r≦Th, then the signal distribution pattern is judged as being of a one-valley form, i.e., the image borne by the preliminary reading image signal Sp is judged as a front chest image, and no corrective signal is issued. Therefore, the method of the sixth embodiment offers the same advantages of the methods of the first through fifth embodiments.

In the above sixth embodiment, whether a signal distribution pattern is of a one-valley form or a two-valley form is detected from the rate of change of the accumulated signal values in a certain region. However, the signal distribution pattern can be judged in another way. For example, where a signal distribution pattern is of a one-valley form as illustrated in FIG. 3A, the pattern is downwardly convex near the horizontal center in the image. Where a signal distribution pattern is of a two-valley form as illustrated in FIG. 3B, the pattern is upwardly convex near the horizontal center in the image. Therefore, whether a signal distribution pattern is of a one-valley form or a two-valley form can be detected by checking whether the pattern is downwardly convex or upwardly convex in the vicinity of the horizontal center in the image. The direction in which the signal distribution pattern is convex can be determined by having the density or signal distribution pattern approximate a certain function, and checking whether the derivative of second order of such a function is positive or negative.

Whether a signal distribution pattern is of a one-valley form or a two-valley form can be detected by the circuit 500D shown in FIG. 15. In the circuit 500D, the determining unit 554 determines a value $f''(Xm)$ which the derivative of second order $f''(X)$ takes at the central position Xm. If the value of $f''(Xm)$ is negative, then the determining unit 554 determines that the signal distribution pattern is of a two-valley form, i.e., the image borne by the preliminary reading image signal Sp is a side chest image. If the value of $f''(Xm)$ is positive, then the signal distribution pattern is judged as being of a one-valley form, i.e., the image borne by the preliminary reading image signal is judged as a front chest image. If the image is found to be a side chest image, then a corrective signal T is issued by the determining unit 554, and if the image is found to be a front chest image, then no corrective signal is issued by the determining unit 554, as with the methods of the previous embodiments.

Whether the density distribution pattern is of a one-valley form or a two-valley form may also be detected by determining the dispersion or separation of the pattern or by a known pattern matching process.

FIGS. 3A and 3B show smoothed forms of actual signal distribution patterns. Generally, an actual signal distribution pattern has small changes or fluctuations which are not illustrated in FIGS. 3A and 3B. The terms "one-valley form" and "two-valley form" used above are indicative of basic signal distribution patterns irrespective of such small changes or fluctuations which the actual patterns have.

The method of detecting a one-valley form or a two-valley form may be used to determine other imaged postures than the imaged postures of front and side chest images, and also imaged postures of other body parts. More specifically, when a certain body part is imaged at different postures, it is highly likely for the signal distribution pattern of one body part image to be of a one-valley form and for the signal distribution pattern of the other body part image to be of a two-valley form. Therefore, the imaged postures can be determined by detecting whether the patterns are of a one-valley form or a two-valley form.

In each of the above embodiments, an imaged posture is determined by employing the preliminary reading image signal. In the event that no preliminary reading mode is carried out and image processing conditions are set in the signal processing circuit 313 based on the main reading image signal So, an imaged posture may be determined using the main reading image signal So. While the density of a reproduced image is corrected dependent on the determined imaged posture, an imaged posture may be determined to serve other purposes.

In each of the aforesaid embodiments, the imaged posture of an image recorded on the stimulable phosphor sheet 103. However, the principles of the present invention are not limited to the determination of the imaged posture of a radiation image recorded on the stimulable phosphor sheet 103, but are also applicable to the determination of the imaged postures of other images taken in medical imaging systems.

According to the method of the present invention, the imaged posture of an image taken for medical diagnosis can automatically and accurately be determined. By carrying out the method of the invention in a radiation image information recording and reproducing system, as described above, the densities of areas of interest in reproduced images of an object can be uniformized even if the object is imaged at different postures, with the result that the radiation images can smoothly and accurately be diagnosed.

Although certain preferred embodiments have been shown and described, it should be understood that many changes and modifications may be made therein without departing from the scope of the appended claims.

We claim:

1. A method of determining the imaged posture of a medical image, comprising the steps of:
   (i) determining a distribution of an image signal bearing a transmitted image of a human body, along a prescribed direction across the image;
   (ii) accumulating signal values of the distribution along said direction to find accumulated values at points along said direction;
   (iii) determining a rate of change of said accumulated values in a region along said direction; and
   (iv) determining the imaged posture of said image based on said rate of change.

2. A method according to claim 1, wherein the sum or average value of signal values of respective pixel rows extending in a direction transverse to said direction is used as the distribution of said signal values.

3. A method according to claim 1, wherein a distribution of signal values of an array of pixels parallel to said direction is used as the distribution of said signal values.

4. A method of determining the imaged posture of a medical image, comprising the steps of:
   (i) determining a distribution of an image signal bearing a transmitted image of a human body, along a prescribed direction across the image;
   (ii) determining the separation of said distribution according to one of a class separation approach, a correlative standard approach and a least square standard approach; and
   (iii) determining the imaged posture of said image based on said separation.

5. A method according to claim 4, wherein the sum or average value of signal values of respective pixel rows extending in a direction transverse to said direction is used as the distribution of said signal values.

6. A method according to claim 4, wherein a distribution of signal values of an array of pixels parallel to said direction is used as the distribution of said signal values.

7. A method of determining the imaged posture of a medical image, comprising the steps of:
   (i) determining a distribution of an image signal bearing a transmitted image of a human body, along a prescribed direction across the image;
   (ii) determining an average value of said distribution near a central region of the image in said direction; and (iii) determining the imaged posture of said image based on the magnitude of said average value.

8. A method according to claim 7, wherein the sum or average value of signal values of respective pixel rows extending in a direction transverse to said direction is used as the distribution of said signal values.

9. A method according to claim 7, wherein a distribution of signal values of an array of pixels parallel to said direction is used as the distribution of said signal values.

10. A method of determining the imaged posture of a medical image, comprising the steps of:
 (i) determining a distribution of an image signal bearing a transmitted image of a human body, along a prescribed direction across the image;
 (ii) determining a degree of matching between a pattern of said distribution and each of a plurality of basic signal distribution patterns which have been predefined and which each represent a different imaged posture of a human body; and
 (iii) determining the imaged posture of said image based on said degree of matching.

11. A method according to claim 10, wherein the sum or average value of signal values of respective pixel rows extending in a direction transverse to said direction is used as the distribution of said signal values.

12. A method according to claim 10, wherein a distribution of signal values of an array of pixels parallel to said direction is used as the distribution of said signal values.

13. A method of determining the imaged posture of a medical image, comprising the steps of:
 (i) determining a distribution of an image signal bearing a transmitted image of a human body, along a prescribed direction across the image;
 (ii) determining a mathematical function approximating a pattern of said distribution;
 (iii) thereafter, determining a derivative of second order of said function;
 (iv) checking whether said derivative of second order is of a positive or negative value in a predetermined region in the image; and
 (v) determining the imaged posture of said image based on whether said derivative of second order is of a positive or negative value.

14. A method according to claim 13, wherein the sum or average value of signal values of respective pixel rows extending in a direction transverse to said direction is used as the distribution of said signal values.

15. A method according to claim 13, wherein a distribution of signal values of an array of pixels parallel to said direction is used as the distribution of said signal values.

16. A method of determining the imaged posture of a medical image, comprising the steps of:
 (i) determining a distribution of an image signal bearing a transmitted image of a human body, along a prescribed direction across the image;
 (ii) detecting whether a pattern of said distribution is basically of a one-valley form or a two-valley form; and
 (iii) determining the imaged posture of said image based on whether a pattern of said distribution is basically of a one-valley form or a two-valley form.

17. A method according to claim 16, wherein the sum or average value of signal values of respective pixel rows extending in a direction transverse to said direction is used as the distribution of said signal values.

18. A method according to claim 16, wherein a distribution of signal values of an array of pixels parallel to said direction is used as the distribution of said signal values.

* * * * *